United States Patent
Bull (10) Patent No.: US 12,184,517 B2
(45) Date of Patent: Dec. 31, 2024

(54) MONITORING NETWORK CONNECTIONS (71) Applicant: BRITISH TELECOMMUNICATIONS PUBLIC LIMITED COMPANY, London (GB)

(72) Inventor: Nicola Bull, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 18/041,464

(22) PCT Filed: Aug. 11, 2021

(86) PCT No.: PCT/EP2021/072363
§ 371 (c)(1),
(2) Date: Feb. 13, 2023

(87) PCT Pub. No.: WO2022/034129
PCT Pub. Date: Feb. 17, 2022

(65) Prior Publication Data
US 2023/0300040 A1    Sep. 21, 2023

(30) Foreign Application Priority Data
Aug. 13, 2020 (GB) .................... 2012610

(51) Int. Cl.
*H04L 43/022* (2022.01)
*H04L 43/16* (2022.01)

(52) U.S. Cl.
CPC .......... *H04L 43/022* (2013.01); *H04L 43/16* (2013.01)

(58) Field of Classification Search
CPC ...... H04L 43/022; H04L 43/024; H04L 43/16
See application file for complete search history.

(56) References Cited

U.S. PATENT DOCUMENTS

| 8,176,154 | B2 * | 5/2012 | Minhazuddin | ........ H04L 43/024 709/224 |
| 2006/0176824 | A1 * | 8/2006 | Laver | ...................... H04L 41/00 370/241 |

(Continued)

FOREIGN PATENT DOCUMENTS

| EP | 2042960 | A2 | 4/2009 | |
| EP | 2586158 | A1 * | 5/2013 | ....... H04L 29/08081 |

(Continued)

OTHER PUBLICATIONS

Gehlert, Andreas, et al. "Online testing, requirements engineering and service faults as drivers for adapting service compositions." Workshop on Service Monitoring, Adaptation and Beyond. (Year: 2009).*

(Continued)

*Primary Examiner* — John M Macilwinen
(74) *Attorney, Agent, or Firm* — PRANGER LAW PC (57) ABSTRACT

Methods and apparatus are disclosed for monitoring a network connection (13) at a first sampling rate to generate monitoring data for the network connection for determining a performance issue in the network. The method involves identifying a communication occurring via the network connection (13), wherein performance metrics are available for the communication; and responsive to a trigger in respect of the communication, adapting the sampling rate to a second sampling rate greater than the first sampling rate so as to determine whether a performance degradation in the communication is attributable to the network connection (13). The adapting of the sampling rate to a second sampling rate is triggered by comparison of one or more of the available performance metrics for the communication with an adjustable threshold.

19 Claims, 5 Drawing Sheets

(56) References Cited

U.S. PATENT DOCUMENTS

| | | | | |
|---|---|---|---|---|
| 2006/0221942 | A1* | 10/2006 | Fruth | H04M 3/2236 |
| | | | | 370/356 |
| 2007/0263775 | A1* | 11/2007 | Clark | H04L 43/022 |
| | | | | 379/1.01 |
| 2010/0110887 | A1* | 5/2010 | Beaujean | H04L 47/824 |
| | | | | 370/230 |
| 2012/0014277 | A1* | 1/2012 | Eckley, IV | H04L 43/04 |
| | | | | 370/252 |
| 2013/0163730 | A1* | 6/2013 | Majd | H04M 1/24 |
| | | | | 379/9 |
| 2014/0215056 | A1 | 7/2014 | Malakhova et al. | |
| 2017/0033887 | A1 | 2/2017 | Lei et al. | |
| 2019/0171169 | A1 | 6/2019 | Di et al. | |
| 2020/0267063 | A1* | 8/2020 | Ye | H04L 43/024 |
| 2020/0342346 | A1* | 10/2020 | Wulff | H04L 41/40 |

FOREIGN PATENT DOCUMENTS

| | | | | |
|---|---|---|---|---|
| EP | 3399723 | A1 * | 11/2018 | H04L 1/002 |
| WO | WO-2007011947 | A1 | 1/2007 | |
| WO | WO-2016102999 | A1 | 6/2016 | |

OTHER PUBLICATIONS

Boutaba R., et al., "A Comprehensive Survey on Machine Learning for Networking: Evolution, Applications and Research Opportunities," Journal of Internet Services and Applications, Jun. 21, 2018, vol. 9, No. 1, 99 pages.

Combined Search Report under Section 17(5)(b) and Abbreviated Examination Report under Section 18(3) for Great Britain Application No. 2012610.8, mailed on Nov. 16, 2020, 8 pages.

International Search Report and Written Opinion of the International Searching Authority for Application No. PCT/EP2021/072363, mailed on Nov. 16, 2021, 16 pages.

Krejci J., et al., "Impulse Noise Influencing xDSL Technologies," Proceedings of 15th International Conference Mechatronika, 2012, 4 pages.

Notification of Transmittal of the International Preliminary Report on Patentability for Application No. PCT/EP2021/072363, mailed Nov. 2, 2022, 17 pages.

Written Opinion of the International Preliminary Examining Authority for PCT/EP2021/072363, mailed on Aug. 16, 2022, 11 pages.

\* cited by examiner

Figure 3(a) - VoIP Monitoring Flow - upper section

Figure 3(b) - VoIP Monitoring Flow - lower section

Figure 4

MONITORING NETWORK CONNECTIONS

PRIORITY CLAIM

The present application is a National Phase entry of PCT Application No. PCT/EP2021/072363, filed Aug. 11, 2021, which claims priority from GB Patent Application No. 2012610.8, filed Aug. 13, 2020, each of which is hereby fully incorporated herein by reference.

TECHNICAL FIELD

The present disclosure relates to network monitoring, in particular during Voice-over-IP (VoIP) calls or other such streaming over a network connection.

BACKGROUND

Voice-over-Internet Protocol (usually referred to as "Voice over IP", "VoIP" or "IP telephony") relates to the delivery of voice and other audio communications (and also to multimedia sessions including an audio component) over Internet Protocol (IP) networks such as the Internet, rather than being provided simply via a public switched telephone network (PSTN).

While some of the steps and concepts involved in relation to VoIP sessions are generally similar to traditional digital telephony and involve signaling, channel set-up, digitization of analogue voice signals, and encoding, with VoIP sessions, instead of the digital signals being transmitted over a circuit-switched network such as the PSTN, the digital information is instead packetized, and the transmission then involves IP packets being transmitted over a packet-switched network such as the Internet. The IP packets effectively transport audio streams using media delivery protocols that encode audio data (and video data, where applicable) with audio codecs (and/or video codecs, where applicable), an audio (and/or video) codec being a device or computer program for encoding and/or decoding a digital stream of audio (and/or video) data.

VoIP plays a significant and increasing role in audio (and multimedia) communication services provided by Internet and Telecommunications Service Providers to their customers. Many VoIP services are supplied over private networks, whose parameters can be carefully controlled to ensure that call quality is maintained in line with expected demand. Nowadays, however, many VoIP services involve providing access over the Internet, enabling customers to use publicly-available networks or low-cost broadband connections.

VoIP is therefore a real-time IP layer service, and as such, the quality of a VoIP call (or "session") may be determined or at least affected by a number of factors such as IP packet loss as well as variations in arrival time of packets known as jitter. There are a variety of techniques for computing a representation of the perceived quality of the call known as the Mean Opinion Score (MOS). VoIP applications typically measure key parameters such as packet loss and jitter, and compute a MOS during the call. The results may be used to mitigate performance issues (e.g. using packet loss concealment) and report on the quality. Some services may request a post-call rating of quality from the user while others may provide some form of real-time indication of the current quality of the call. There are a number of potential causes of IP packet loss and jitter, including IP network congestion, WiFi connectivity or the quality of the broadband connection, for example.

The majority of the broadband access networks in the UK and many other countries uses a variant of Digital Subscriber Line (DSL) technology such as ADSL or VDSL (generally referred to as "xDSL"). An ADSL service runs over the access network between a telephone exchange and customer premise, while a VDSL service, also known as Fiber to the Cabinet (FTTC), passes the VDSL signal between the street cabinet and the customer premise. The performance of the DSL network can be susceptible to factors/conditions such as radio interference and poor line connectivity. These conditions can result in brief or longer periods of line errors at the DSL layer which in turn can cause packet loss and jitter at the IP service layer. The DSL link is often considered to be the most likely cause of broadband performance problems and therefore a customer report of problems with IP telephony is likely to be interpreted and initially investigated as a (possible/probable) broadband fault.

VoIP has become a key service, and a customer's perception of the quality of that service is likely to be adversely affected if problems are experienced, even for brief periods, during a VoIP call or meeting, or other such VoIP-based session. This can result in customer-reported faults which may be difficult to resolve with current diagnostic capabilities.

Referring to various prior disclosures, a paper entitled "Impulse Noise Influencing xDSL Technologies" by Jaroslav Krejci and Tomas Zeman (Proceedings of 15th International Conference MECHATRONIKA, Prague, 2012, pages 1-4.) discusses how impulse noise has a severe impact on the whole family of xDSL technologies. The paper focuses on an analysis of impulse noise that is present on subscriber lines and describes three basic impulse noise models, known as "REIN" (Repetitive Electrical Impulse Noise), "SHINE" (Single High Impulse Noise) and "PEIN" (Prolonged Electrical Impulse Noise).

Referring now to prior patent documents, U.S. Pat. No. 8,176,154 ("Minhazuddin et al"), entitled "Instantaneous User Initiation Voice Quality Feedback", relates to data networks, and specifically to voice communications over distributed processing networks.

United States Patent Application Pub. No. 2007/0263775 ("Clark") entitled "Distributed System and Method for Diagnosing Network Problems" relates to network monitoring systems and methods. In particular, it relates to a distributed system and method for diagnosing problems in a signal at an endpoint in a network system, wherein the capabilities of a conventional network probe or analyzer may be replicated as virtual functions.

Prior techniques relating to real-time services such as VoIP tend to focus on mitigating issues such as packet loss and jitter at the IP layer rather than attempting to establish and deal with the underlying cause of any IP layer performance problems. Similarly, prior techniques to do with DSL performance problems (particularly issues such as the impact of impulse noise and other radio frequency interferers) tend to focus on mitigating the effects.

SUMMARY

According to a first aspect of the disclosure, there is provided a computer implemented method for monitoring a network connection at a first sampling rate to generate monitoring data for the network connection for determining a performance issue in the network, the method comprising: identifying a communication occurring via the network connection, wherein performance metrics are available for the communication; and responsive to a trigger in respect of the communication, adapting the sampling rate to a second sampling rate greater than the first sampling rate so as to determine whether a performance degradation in the communication is attributable to the network connection; wherein the adapting of the sampling rate to a second sampling rate is triggered by comparison of one or more of the available performance metrics for the communication with an adjustable threshold.

According to some embodiments, the identified communication is a communication occurring between devices on a path an intermediate portion of which traverses the network connection. At least one of the devices may be a device (e.g. a user device such as a personal computing device, tablet, smartphone, etc.) in a Local Area Network (LAN) such as may exist in a customer premises. Such a LAN may have a LAN gateway device which may form an endpoint of the network connection, and/or which may perform at least some monitoring of the network connection. Alternatively or additionally, at least some monitoring of the network connection may be performed by a device outside the LAN such as a Digital Subscriber Line Access Multiplexer (DSLAM) or a Multi-Service Access Node (MSAN), for example.

According to some embodiments, the method may comprise obtaining performance metrics for the communication before and/or after the adapting of the sampling rate to the second sampling rate.

According to some embodiments, the communication may occur at an application layer, and the trigger may be in respect of the communication at the application layer.

According to some embodiments, the trigger is dependent on the available performance metrics for the communication. The trigger may be based on one or more of: a packet loss measure; a measure of delay, a measure of jitter, a mean opinion score; or other available (VoIP or other) performance metrics for the communication.

According to some embodiments, the network connection is a digital subscriber line.

According to some embodiments, the sampling is of one or more parameters of the network connection. The sampling may be of one or more network layer parameters (e.g. Digital Subscriber Line parameters). The parameters may include counts of one or more of code violations, CV; Errored Seconds, ES; Severely Errored Seconds, SES; or other network connection (i.e. DSL or similar) parameters.

The adapting of the sampling rate may further include adapting a set of sampled parameters (e.g. to include additional parameters not sampled unless a trigger in respect of the communication has resulted in the sampling rate being adapted to the second sampling rate).

According to some embodiments, the communication is a streamed communication occurring via the network connection.

According to some embodiments, the communication is a communication occurring via the network connection in accordance with a version of the Internet Protocol, IP, such as IPv4 or IPv6.

According to some embodiments, the communication may be a Voice-over-Internet-Protocol, VoIP, communication occurring via the network connection.

According to some embodiments, the threshold may be adjusted in dependence on past performance metrics available for the network connection, e.g. from previous communications via the network connection and/or involving one or more of the devices involved in the present communication.

According to some embodiments, the threshold may be adjusted during a communication. Alternatively or additionally, the threshold may be adjusted for use in determining whether to adapt the sampling rate during a subsequent communication.

According to a second aspect of the disclosure, there is provided apparatus for monitoring a network connection at a first sampling rate to generate monitoring data for the network connection for determining a performance issue in the network, the apparatus comprising one or more computing devices configured to: identify a communication occurring via the network connection, wherein performance metrics are available for the communication; and responsive to a trigger in respect of the communication, adapt the sampling rate to a second sampling rate greater than the first sampling rate so as to determine whether a performance degradation in the communication is attributable to the network connection; wherein the one or more computing devices are configured to adapt the sampling rate to a second sampling rate triggered by comparison of one or more of the available performance metrics for the communication with an adjustable threshold.

According to a third aspect of the disclosure, there is provided a computer program element comprising computer program code to, when loaded into a computer system and executed thereon, cause the computer to perform the method according to the first aspect.

The various options and embodiments referred to above in relation to the first aspect are also applicable in relation to the second and third aspects.

Some embodiments of the disclosure use real-time sampling of key VoIP (or other such streaming) performance parameters in respect of the communication (at the application layer) to obtain performance metrics such as Mean Opinion Score (MOS), Packet Loss (PL) and Jitter to identify degraded quality of service and then, subject to triggering based on the adjustable threshold, instigate a period of high-resolution (i.e. more frequent) sampling of DSL (or other network connection) layer parameters in respect of the underlying DSL (or other network) connection via which the VoIP (or other) communication is being carried to determine whether a DSL (or other network) layer performance problem is the (likely) cause. Such a technique may also provide a correlation between the service layer event and an underlying DSL network layer event which is not supported by current capabilities. Using an adjustable threshold (in respect of the VoIP (or other such streaming) performance metrics) for triggering the switch to high-resolution sampling of DSL layer parameters, which may be adjusted for use in subsequent calls based on aggregated data for one or more past calls and/or may be adjusted during an in-progress call (based on data for that call and/or data in respect of one or more past calls), the threshold can be maintained at or moved to levels that minimize false-positives and/or false-negatives in respect of the triggering of the switch.

Currently DSL network layer performance parameters are generally sampled at regular but low-resolution intervals (e.g. every 15 minutes, or every two hours, for example) and processed later as required to identify certain fault conditions. However, real-time services such as VoIP may experience short periods of poor performance, and it may be difficult to determine from the low-resolution information whether or not an issue with the broadband connection is responsible for such instances of poor VoIP service. Continuous high-resolution sampling of DSL parameters is generally not practical for reasons such as system load and data volumes, and most of the time would not be required.

Using the real-time service data to trigger a period of high-resolution data-collection at the DSL network layer allows DSL performance issues to be confirmed or excluded as the cause. If confirmed then further diagnostic analysis could be run to determine the specific nature of the broadband fault. Conversely if the broadband connection is determined not to be the problem then diagnostics for other areas of the service could be engaged.

BRIEF DESCRIPTION OF THE DRAWINGS

A preferred embodiment of the present invention will now be described with reference to the appended drawings, in which.

DETAILED DESCRIPTION

With reference to the accompanying figures, methods and apparatus according to various embodiments will be described.

Figure 1:
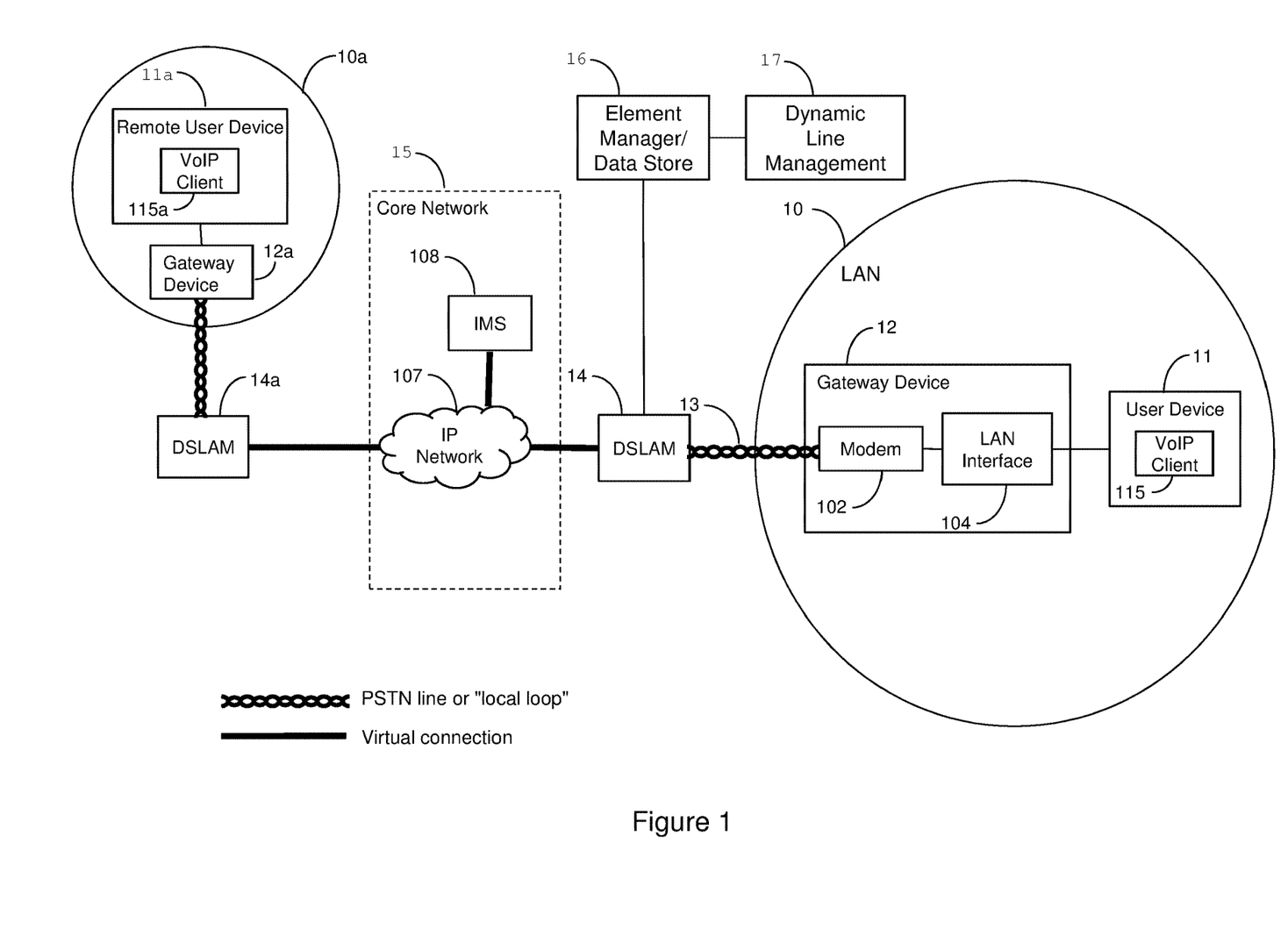
FIG. 1 illustrates a simplified diagram of an IP-based network.

FIG. 1 illustrates a simplified diagram of an IP-based network that can be used to deliver a Voice over IP (VoIP) service (or, more generally, an IP multimedia service) to a customer's user device 11 which, in this example, is located in a local area network (LAN) 10. The user device 11 can be a dedicated consumer device such as a VoIP phone or may be a general purpose computing device (e.g. a smart-phone or a laptop) running a client application.

In this example, a VoIP client 115 is incorporated into and is running on a general purpose user device 11, communicating with a LAN gateway device 12 via a LAN interface 104. The VoIP client may however be incorporated into the gateway device 12 itself.

A generally IP-based network carries VoIP traffic between the user device 11 and one or more remote third party devices, represented in this case by a remote user device 11a in a remote LAN 10a connected via its own LAN gateway device 12a (the sub-components of which are not shown, but which may be the same as or similar to those of LAN gateway device 12) to a DSLAM 14a. Remote user device 11a has a VoIP client 115a incorporated therein, allowing it to be involved in a VoIP call or multimedia session with user device 11.

The overall IP-based network comprises a copper and/or aluminum access network (which, in the case of the LAN 10, comprises a PSTN line 13 or "local loop" acting as a Digital Subscriber Line (xDSL, sometimes simply referred to as a DSL)) connection extending between an xDSL modem 102 of the LAN Gateway Device 12 and a Digital Subscriber Line Access Multiplexer (DSLAM) 14 (or alternatively a Multi-service Access Node (MSAN), which would generally be operated by the network service provider), and a core network 15 (which in this example, comprises an IP network 107, and incorporates an IP Multimedia Subsystem (IMS) 108). The IMS is a standards-based architectural framework for delivering multimedia communications services such as voice, video and text messaging over IP networks.

The performance of the digital subscriber line over the DSL connection 13 (i.e. between the modem 102 of the LAN Gateway Device 12 and the DSLAM 14) is continuously monitored, with performance data being collected at intervals, in respect of performance of the connection at different times. Performance metrics are collected at the DSLAM 14 and/or at the Gateway Device 12, and may be sent to an Element Manager/Data Storage system 16. This line performance data is usually used by a Dynamic Line Management (DLM) system 17 to optimize the performance of the line for speed and stability.

The principle of operation will be described with reference to an embodiment shown in FIG. 2.

Figure 2:
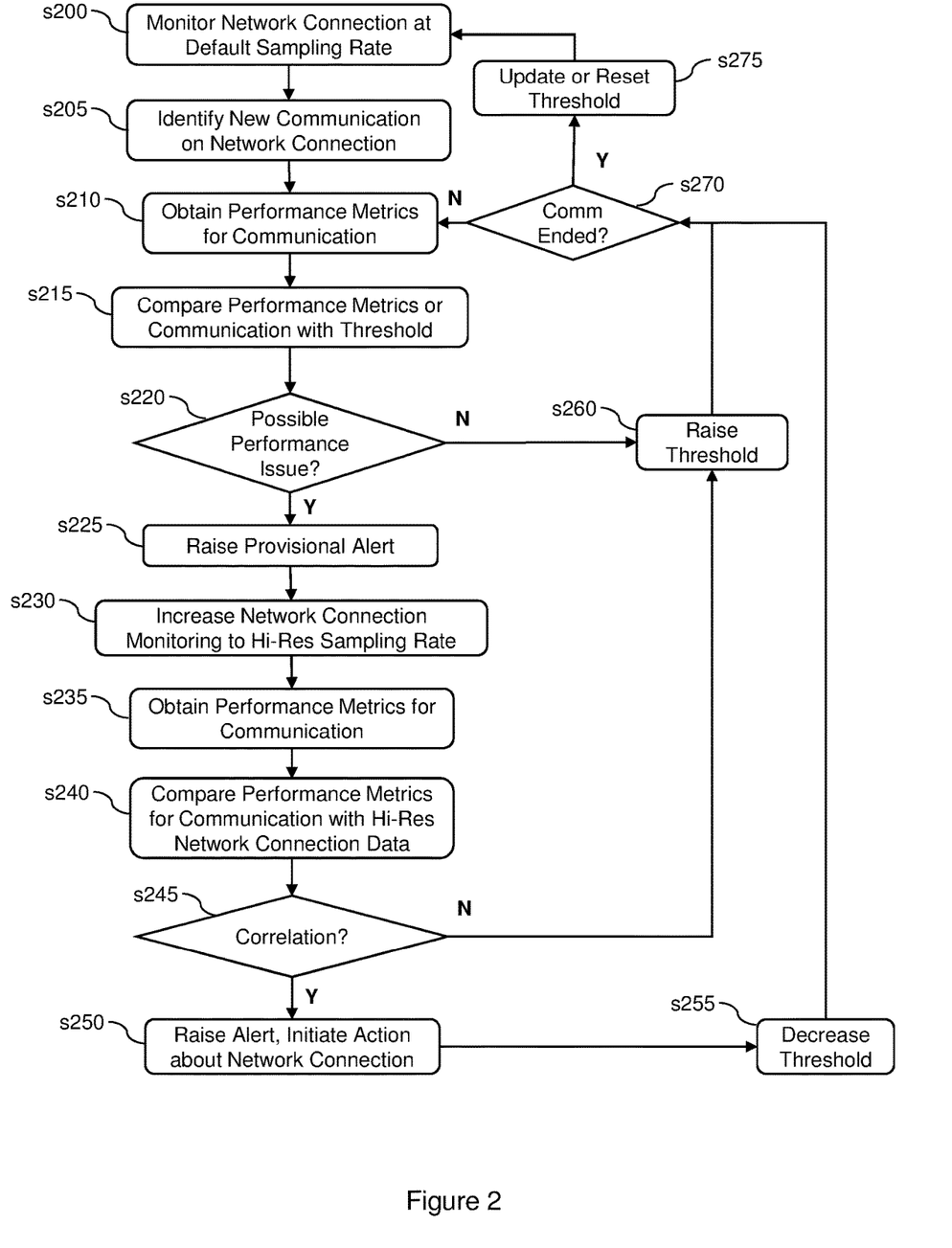
FIG. 2 is a flow-chart showing a process according to an embodiment of the disclosure.

In the process shown in FIG. 2, s200 indicates that prior to initiation or identification of a VoIP call or other such communication between a first device (e.g. the user device 11 in the LAN 10, in FIG. 1) and another device (e.g. remote user device 11a), ongoing monitoring of DSL parameters is happening at a default sampling rate in respect of the network connection (e.g. the LAN's DSL connection, running over PSTN line 13). This may involve DSL network layer performance parameters (e.g. counts of code violations (CV), Errored Seconds (ES), Severely Errored Seconds (SES), etc.) being sampled at regular but low-resolution intervals such as every 15 minutes, or every two hours, for example, with the data being collected at entities at one or both ends of the DSL connection (such as the DSLAM 14 and/or the modem 102), and passed to the Element Manager/Data Storage system 16 as set out above.

On identification (s205) of a new communication such as VoIP call between user devices that is carried via the DSL network connection for at last a part of the end-to-end path between the end-devices (i.e. user devices 11 and 11a), performance metrics (e.g. VoIP performance metrics such as packet loss measures, measures of delay, measures of jitter, calculation of a mean opinion score, etc.) are obtained in respect of the (VoIP) communication (s210).

These (VoIP) performance metrics for the VoIP communication are compared (s215) with a threshold level and a determination is made as to whether there may be a possible VoIP performance issue (s220). If not, the process proceeds on the basis that the threshold for investigating possible VoIP performance issues is currently set too low, and the threshold is thus raised (s260) in order to reduce the likelihood of further false positives before proceeding to s270 (discussed below).

If it is determined at s220 that there may in fact be a possible VoIP performance issue, the process proceeds to s225 at which a provisional alert may be raised (or the process may simply proceed to s230).

At s230, the sampling rate for the monitoring of the DSL network layer performance parameters is increased to a more frequent ("high-resolution") sampling rate (every second, or every few seconds, for example). Other parameters not normally sampled may be sampled, alternatively or additionally to those normally sampled.

At s235, performance metrics are again obtained in respect of the (VoIP) communication.

At s240, the performance metrics for the VoIP communication are compared with the "high-resolution" network connection data for the period in question, and it is determined at s245 whether there is a correlation between performance in respect of the VoIP communication between the user devices and the performance of the DSL connection. If not, the process may proceed to s270 via s260, with the threshold (NB a VoIP performance threshold) for triggering "high-resolution" monitoring of DSL network connection data being raised (s260) in order to reduce the likelihood of further false positives.

If it is found at s245 that there is a correlation, it is concluded that DSL issues are the likely cause of VoIP performance problems. An alert may be raised, and action may be initiate initiated to resolve any network connection issues (s250). The VoIP performance threshold for triggering "high-resolution" monitoring of DSL network connection data may be reduced (s255) on the basis that the triggering was not a false-positive (indicating that a lower threshold may in fact be applicable), and the process proceeds to s270.

At s270, it is determined if the VOIP communication is still in progress or has ended. If it is still in progress, the process returns to s210. If not, the process proceeds to s275, at which the VoIP performance threshold may be updated for use in subsequent calls (e.g. to a new "default" level) or reset to a standard level for the beginning of a new call before returning to s200.

Figure 3A:
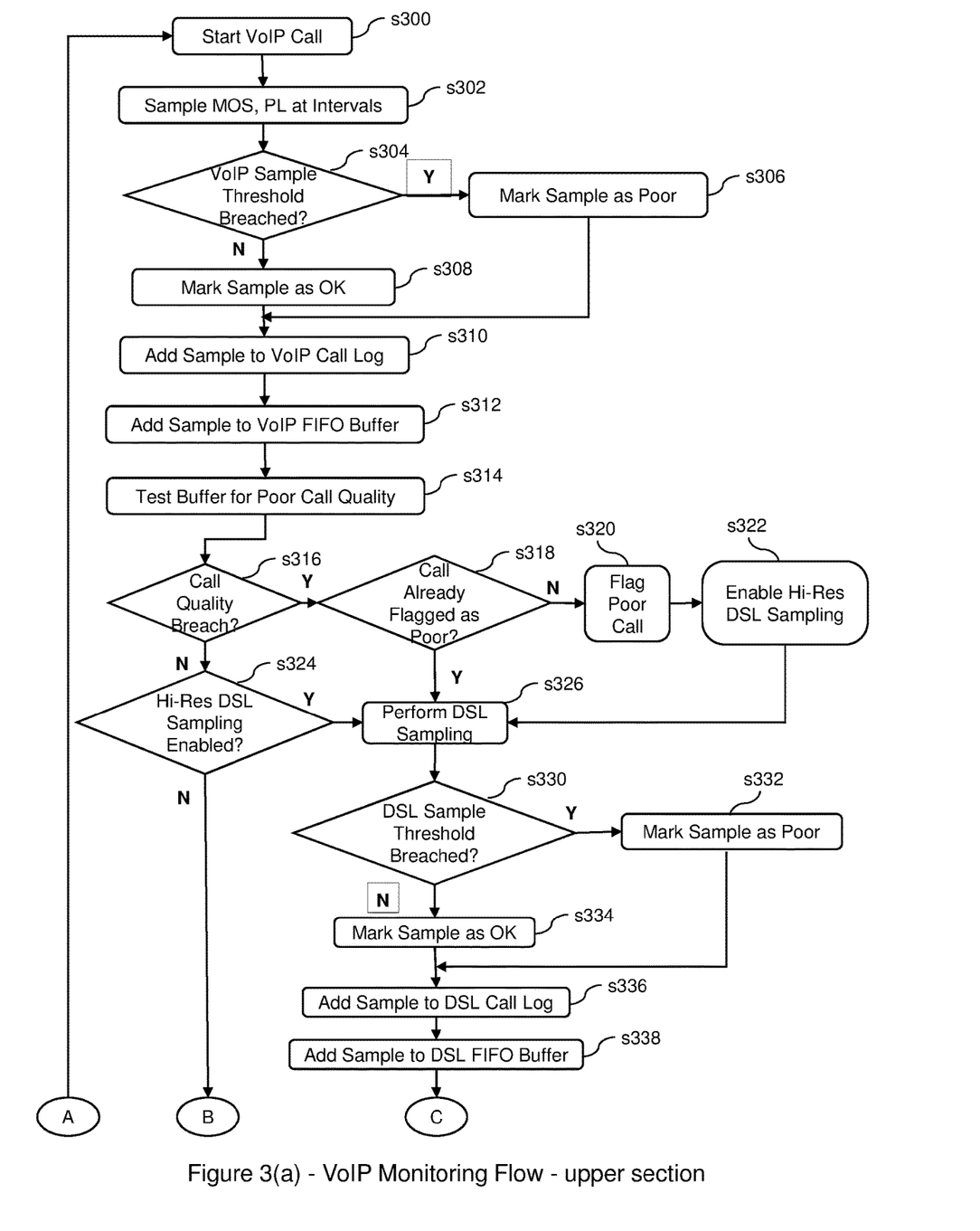
FIG. 3 is a flow-chart (divided into two parts, shown as FIGS. 3(a) and 3(b)) showing a process according to an embodiment of the disclosure.
Figure 3B:
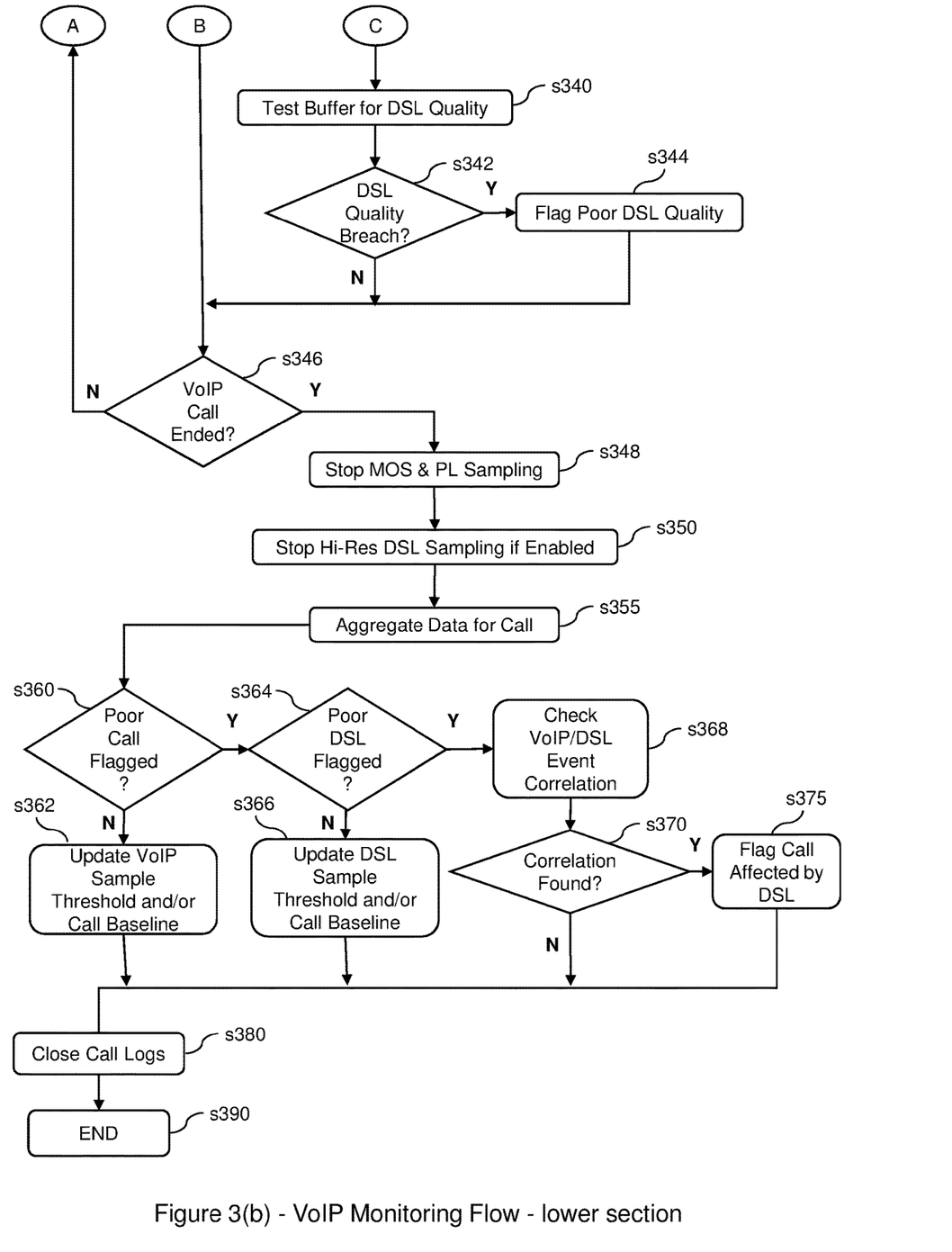

A further embodiment is shown in FIG. 3 (which is divided into two parts, shown as FIGS. 3(a) and 3(b), with bridging points marked as "A", "B" and "C" between the two parts).

When a VoIP call commences (step s300), key parameters at the VoIP client application (e.g. the VoIP client 115, in the example shown in FIG. 1), including packet loss (PL), jitter and MOS (Mean Opinion Score), with timestamp, are recorded in real-time at regular intervals e.g. per second throughout the call (s302). At the end of a call, details of the call, including quality parameters are logged. Under normal conditions, the quality of the VoIP call and the supporting xDSL circuit performance will fall within thresholds for acceptable performance. However, under fault conditions, which may be intermittent in nature, there may be brief or longer periods during a call where the quality of the VoIP session falls below the acceptable threshold. If the supporting DSL circuit has a physical connectivity defect, which may be intermittent in nature, the circuit may be susceptible to radio interference or even brief periods of high signal attenuation which result in line errors e.g. code violations which may be the cause of the poor quality of the VoIP call.

The perceived quality of a VoIP call at any instant is represented in this example by the MOS value. Call quality can be reduced by loss of IP packets and by excessive jitter or delay in packet arrival. Depending on how MOS is calculated by the VoIP client application, packets lost during quiet (no speech) periods may be disregarded in the MOS calculation as the effect will not be audible.

One or more thresholds for poor VoIP quality for a given line are stored on the client CPE device (e.g. the LAN Gateway Device 12 in the example shown in FIG. 1) (although it is possible that they may be stored on a separate device or by a device such as user device 11 in FIG. 1). These thresholds are dynamically updated, in this example following calls as described below, though an absolute service quality threshold may also be defined, and in embodiments such as that described with reference to FIG. 2, they may (also) be updated during calls. During the call the VoIP parameters for each sample are compared with the threshold(s) (s304) and the sample is flagged as OK (s308) or Poor (s306) based on the result of the comparison. The sample is added to the VoIP call log (s310) and the sample marking (in this example an "OK" or "Poor" mark) is added to the VoIP FIFO buffer (s312). An algorithm, explained further in the section entitled 'Quality Threshold Checking' below, is then used to analyze the markings of multiple VoIP samples in the FIFO buffer (s314) to determine whether VoIP call quality has been breached (s316). If so, a check is performed to determine if the call has already been flagged as poor (s318) and if not a VoIP Quality Flag is set to Poor (for this call) (s320), therefore any subsequent Call Quality breaches, during the same VoIP session, will not result to any further changes to the call flag status. At the end of the call, if no breach has been detected, the call VoIP parameters are used to update the baseline (s362).

If the VoIP quality threshold is breached during the call (s316) and the Call Flag has not already been set (s318) then the VoIP Call Quality flag is set to Poor (s320) and high resolution sampling, e.g. per second, of key xDSL parameters is started (s322), which may include counts of code violations (CV), Errored Seconds (ES) and Severely Errored Seconds (SES), for example. Each xDSL line will have a characteristic behavior in normal operation and so a dynamically updated baseline performance is stored in the client CPE device, including threshold(s) for poor performance. An absolute service quality threshold may also be defined. As samples are recorded (s326), the parameters are compared with the threshold(s) using an algorithm to determine whether xDSL performance has breached the poor performance threshold(s) (s330) and each sample is marked as OK (s334) or Poor (s332) based thereon. The xDSL sample is added to the xDSL call log (s336) and the xDSL sample marking, the OK or Poor value, is added to the xDSL FIFO buffer (s338). An algorithm is then used to analyze the markings for the multiple samples stored in the xDSL FIFO Buffer (s340) to determine whether xDSL poor quality has been breached (s342) and if so, an xDSL Line Quality Flag is set to Poor (for the current call) (s344).

At the end of the VoIP call (s346), the VoIP sampling, and the high resolution DSL sampling if enabled, are stopped (s348, s350). Data aggregation is applied to the samples in the VoIP Call Log and, if created, the xDSL Call Log (s355). These aggregations can be used, if applicable, for baseline and threshold updates. Further explanation given in 'Dynamic Baselines and Thresholds' below. Several checks may then be performed before the final call summary details are added to the call log. Firstly, the VoIP Call Quality Flag is checked (s360). If this is OK, then the call VoIP parameters are used to update the baseline and poor quality thresholds (s362). If the VoIP Call Quality Flag is set to Poor, then the VoIP parameters are not used to update the baseline and the xDSL Line Quality Flag is checked (s364). If the xDSL Quality Flag is OK, then the xDSL baseline and quality threshold(s) are updated (s366). This results in the VoIP call being logged as "Poor", but not due to poor xDSL quality. If the xDSL Line Quality Flag is set to Poor, then a further check is performed to determine whether VoIP poor quality events—such as lost IP Packets—correlate with xDSL line quality breach events such as excessive CV or ES (s368, s370). If so, then the call can be logged as Poor due to poor quality xDSL performance (s375). Upon completion of these checks the VoIP Call Log is closed (s380) and is ready for submission to the central management system, further explained in 'Client Reporting' below. This ends the process (s390).

Quality Threshold Checking

One feature of the algorithm used to detect poor quality is that it should generally avoid spurious triggering. One approach to this is to hold a rolling FIFO buffer of samples of defined length e.g. 'x' seconds, updated at the sample frequency e.g. per second. At each update, the FIFO buffer is checked for the existence of 'y' sequential Poor Quality Flags or 'z' Poor Quality Flags in the FIFO buffer. For example, the FIFO buffer length (x) may be set to 10 seconds. If 'y' is set to 3 and 'z' set to 5, then at each buffer update, if the three most recent samples or any five samples in the 10-second buffer period are rated as Poor, then the algorithm outcome is Poor. A count of breached samples throughout the call may also be recorded to provide a record of the pattern of disruption. This algorithm may be used for both the VoIP and xDSL quality checking.

Dynamic Baselines and Thresholds

Each customer circuit will have a unique characteristic behavior for the xDSL line and VoIP call performance. While absolute thresholds may be set for service quality, a better quality of service experience is provided if each circuit can produce and dynamically update its own baseline and quality thresholds.

For VoIP call quality, key parameters include MOS, Packet Loss, jitter and delay. During a call, a MOS value is calculated for each sample, e.g. per second. At the end of the call, the median of the MOS values for all the samples is calculated, as is the median of the lowest x % of sample values. This provides a baseline for the normal and lowest level of call quality for this call.

Similarly, if Packet Loss is to be used, the value for packet loss in each sample is recorded. At the end of the call, the median of the Packet Loss values for all the samples is calculated, as is the median of the highest x % of sample values. This provides a baseline for this call for the normal and highest level of Packet Loss.

The baselines for normal and poorest VoIP performance for this circuit can then be updated using a rolling median algorithm. Note alternative techniques to median values for baselining could be used, such as mean values or calculating a standard deviation score for the difference between the normal and poorest quality values.

A similar baselining technique can be applied to the xDSL parameters, e.g. code violations. Where xDSL sampling has been enabled during a call, the median of the code violation count for each sample period and the median of the highest x % of the counts could be used to set a baseline for the call. A rolling median technique could then be used to set new baselines for the circuit. It is recognized that, due to the intermittent nature of disruptive events on the circuit, xDSL sampling may not be triggered until near the end of a VoIP call, and so a minimum number of samples for a call will be required to be acceptable for baselining. If this minimum is not reached, then no baseline updating is performed.

Client Reporting

The description above has assumed that the client CPE device is performing all the sample evaluation, call summarization and baseline updating as a real-time activity. However, the client will normally be reporting performance information back to a central management system at intervals and the call quality logs and baselines could be returned as part of this reporting process. It would also be possible to perform baseline updating centrally and push the updated thresholds to the client CPE device if a lower frequency of updating is preferred.

Figure 4:
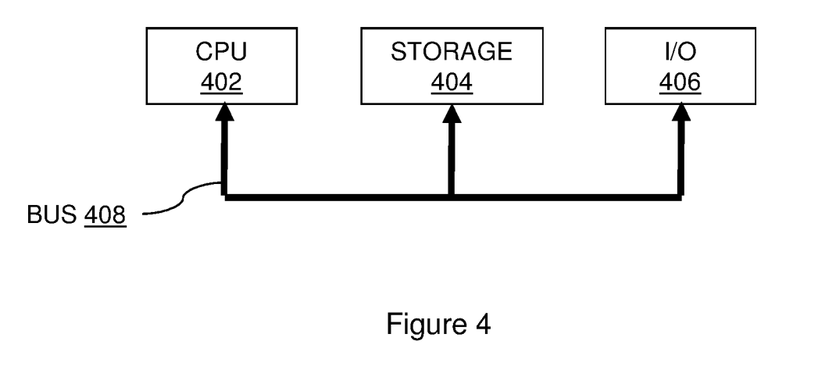
FIG. 4 is a block diagram of a computer system suitable for the operation of embodiments of the present disclosure.

FIG. 4 is a block diagram of a computer system suitable for the operation of embodiments of the present disclosure. A central processor unit (CPU) 402 is communicatively connected to a data store 404 and an input/output (I/O) interface 406 via a data bus 408. The data store 404 can be any read/write storage device or combination of devices such as a random access memory (RAM) or a non-volatile storage device, and can be used for storing executable and/or non-executable data. Examples of non-volatile storage devices include disk or tape storage devices. The I/O interface 406 is an interface to devices for the input or output of data, or for both input and output of data. Examples of I/O devices connectable to I/O interface 406 include a keyboard, a mouse, a display (such as a monitor) and a network connection.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the claims.

The scope of the disclosure may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for monitoring a network connection at a first sampling rate to generate monitoring data for the network connection for determining a performance issue in a network, the method comprising:
identifying a communication occurring via the network connection, wherein performance metrics for determining the performance issue in the network are available for the communication; and
responsive to a trigger in respect of the communication, adapting the first sampling rate to a second sampling rate greater than the first sampling rate so as to determine whether a performance degradation in the communication is attributable to the network connection;
wherein the adapting of the first sampling rate to the second sampling rate is triggered by comparison of one or more of the available performance metrics for the communication with one or more corresponding adjustable performance metric thresholds.

2. The method according to claim 1, wherein the communication occurs at an application layer, and wherein the trigger is in respect of the communication at the application layer.

3. The method according to claim 1, wherein the trigger is dependent on the available performance metrics for the communication.

4. The method according to claim 1, wherein the trigger is based on one or more of: a packet loss measure; a measure of delay; a measure of jitter; or a mean opinion score.

5. The method according to claim 1, wherein the network connection is a digital subscriber line.

6. The method according to claim 1, wherein sampling is of one or more parameters of the network connection.

7. The method according to claim 1, wherein sampling is of one or more network layer parameters.

8. The method according to claim 6, wherein the parameters include counts of one or more of code violations (CV); Errored Seconds (ES); or Severely Errored Seconds (SES).

9. The method according to claim 1, wherein the adapting of the sampling rate further includes adapting a set of sampled parameters.

10. The method according to claim 1, wherein the communication is one of:
a streamed communication occurring via the network connection,
a communication occurring via the network connection in accordance with a version of the Internet Protocol (IP), or
a Voice-over-Internet-Protocol (VOIP) communication occurring via the network connection.

11. The method according to claim 1, wherein:
the threshold is adjusted in dependence on past performance metrics available for the network connection,
the threshold is adjusted during a communication, or
the threshold is adjusted for use in determining whether to adapt the sampling rate during a subsequent communication.

12. An apparatus for monitoring a network connection at a first sampling rate to generate monitoring data for the network connection for determining a performance issue in a network, the apparatus comprising one or more computing devices configured to perform the method of claim 1.

13. A non-transitory computer readable storage medium storing a computer program element comprising computer program code to, when loaded into a computer system and executed thereon, cause the computer system to perform the method as claimed in claim 1.

14. A computer implemented method for monitoring a network connection for determining a performance issue in a network, the method comprising:
setting a default sampling rate for monitoring the network connection;
continuously monitoring the network connection at the default sampling rate;
identifying a new communication occurring via the network connection;
obtaining performance metrics for the new communication;
comparing the performance metrics for the new communication with a threshold;
if the comparing indicates a possible performance degradation in the new communication, adapting the first sampling rate to a second sampling rate greater than the first sampling rate so as to determine whether the performance degradation in the new communication is attributable to the network connection; and
if the comparing indicates no current performance degradation in the new communication, adjusting the threshold to a raised threshold to reduce a likelihood of false positives in future comparisons.

15. The method according to claim 14, wherein determining whether the performance degradation in the new communication is attributable to the network connection comprises:
continuously monitoring the network connection at the second sampling rate to obtain higher-resolution network connection data,
obtaining new performance metrics for the new communication occurring via the network connection, and
comparing the new performance metrics with the higher-resolution network connection data; and
if comparing the new performance metrics indicates that the obtained new performance metrics correlate with the higher-resolution network connection data, attributing the possible performance degradation in the new communication to a performance issue in the network connection; and
if comparing the new performance metrics indicates that the obtained new performance metrics do not correlate with the higher-resolution network connection data, adjusting the threshold to the raised threshold to reduce a likelihood of false positives in future comparisons.

16. A computer implemented method for determining a performance issue in a communication over a network connection in a network, the method comprising:
establishing a threshold for quality of communication via the network connection;
identifying a new communication occurring via the network connection;
sampling a parameter of the new communication at a first sampling rate;
comparing the sampled parameter with the threshold and marking the sampled parameter as either acceptable or not acceptable based on the comparing;
storing the sampled parameter in a call log and adding the marking of the sampled parameter to a buffer;
analyzing contents of the buffer to determine if a quality issue exists in respect of the new communication:
if a quality issue exists, sampling the parameter at a second sampling rate higher than the first sampling rate, and
if no quality issue exists, continuing to sample the parameter at the first sampling rate;
after the new communication ends, aggregating sampled parameters stored in the call log and using the aggregated sampled parameters to update the threshold for quality of communications via the network connection.

17. The method of claim 16, wherein the buffer is a rolling first in first out (FIFO) buffer.

18. The method of claim 16, wherein the threshold for quality of communication via the network connection is unique to the network connection.

19. The method of claim 18, wherein the parameter is at least one of jitter, mean opinion score (MOS), or packet loss (PL).

* * * * *